(12) United States Patent
Owen

(10) Patent No.: US 11,076,935 B2
(45) Date of Patent: Aug. 3, 2021

(54) MOUTHPIECE HAVING ELEVATED CONTACT FEATURES

(71) Applicant: Brandon Owen, Fort Collins, CO (US)

(72) Inventor: Brandon Owen, Fort Collins, CO (US)

( * ) Notice: Subject to any disclaimer, the term of this patent is extended or adjusted under 35 U.S.C. 154(b) by 101 days.

(21) Appl. No.: 16/147,354

(22) Filed: Sep. 28, 2018

(65) Prior Publication Data

US 2020/0100870 A1 Apr. 2, 2020

(51) Int. Cl.
*A61C 7/08* (2006.01)
*A61C 7/36* (2006.01)
*A61C 9/00* (2006.01)

(52) U.S. Cl.
CPC ............... *A61C 7/08* (2013.01); *A61C 7/36* (2013.01); *A61C 9/0006* (2013.01)

(58) Field of Classification Search
CPC ............ A61C 7/36; A61C 7/08; A61C 9/0006
USPC ............................................................. 433/6
See application file for complete search history.

(56) References Cited

U.S. PATENT DOCUMENTS

| | | | |
|---|---|---|---|
| 5,340,656 A | 8/1994 | Sachs et al. | |
| 5,387,380 A | 2/1995 | Cima et al. | |
| 5,658,314 A | 8/1997 | Scheffer et al. | |
| 6,505,625 B1 * | 1/2003 | Uenishi | A61C 7/08 128/848 |
| 7,037,382 B2 | 5/2006 | Davidson et al. | |
| 7,434,582 B2 * | 10/2008 | Eubank | A61C 7/08 128/848 |
| 7,500,846 B2 | 3/2009 | Eshed et al. | |
| 7,604,768 B2 | 10/2009 | Kritchman | |
| 8,001,972 B2 * | 8/2011 | Eubank | A61C 7/08 128/848 |
| 8,033,282 B2 * | 10/2011 | Eubank | A61C 7/08 128/848 |
| 9,445,938 B1 * | 9/2016 | Wagner | A61F 5/566 |
| 10,299,957 B2 * | 5/2019 | Wagner | A61C 7/36 |
| 2003/0207224 A1 | 11/2003 | Lotte | |
| 2006/0021622 A1 | 2/2006 | Buffington | |
| 2007/0079833 A1 | 4/2007 | Lamberg | |
| 2009/0020130 A1 * | 1/2009 | Eubank | A61C 7/08 128/861 |
| 2009/0165805 A1 | 7/2009 | Syrop et al. | |
| 2011/0030704 A1 | 2/2011 | Hanna | |
| 2013/0298916 A1 | 11/2013 | Alvarez et al. | |
| 2014/0283848 A1 | 9/2014 | Crichigno | |
| 2016/0157962 A1 | 6/2016 | Kim et al. | |
| 2017/0000643 A1 | 1/2017 | Gelb et al. | |

(Continued)

OTHER PUBLICATIONS

PCT International Patent Application No. PCT/US19/47203; International Search Report and Written Opinion of the International Searching Authority dated Oct. 22, 2019, 11 pages.

*Primary Examiner* — Matthew M Nelson
(74) *Attorney, Agent, or Firm* — Craig R. Miles; CR Miles P.C.

(57) ABSTRACT

An oral appliance including an upper body having an upper body channel to receive a maxillary dentition of an upper dental arch, a lower body having a lower body channel to receive a mandibular dentition, and at least one node disposed on the lower body base outer surface to engage the upper body outer surface upon receipt of the maxillary teeth of the upper dental arch in the upper body channel and the mandibular teeth of the lower dental arch in the lower body channel.

14 Claims, 15 Drawing Sheets

(56) References Cited

U.S. PATENT DOCUMENTS

2017/0231723 A1\* 8/2017 Lucas ...................... A61C 7/08
                                                              433/6
2017/0312613 A1\* 11/2017 Wright ................. A63B 71/085
2019/0247173 A1   8/2019 Zegarelli \* cited by examiner

MOUTHPIECE HAVING ELEVATED CONTACT FEATURES

I. FIELD OF THE INVENTION

An oral appliance including an upper body having an upper body channel to receive a maxillary dentition of an upper dental arch, a lower body having a lower body channel to receive a mandibular dentition, and at least one node disposed on the lower body base outer surface to engage the upper body outer surface upon receipt of the maxillary teeth of the upper dental arch in the upper body channel and the mandibular teeth of the lower dental arch in the lower body channel.

II. SUMMARY OF THE INVENTION

Accordingly, a broad object of the present invention can be to provide an oral appliance including one or more of: an upper body including an arcuate upper body base joining a maxillary labial wall and a maxillary lingual wall in spaced apart relation defining an upper body channel between opposing inner wall surfaces, the upper body channel having an upper dentition impression which matingly receives the maxillary teeth of an upper dental arch, and a lower body including an arcuate lower body base joining a mandibular labial wall and a mandibular lingual wall in spaced apart relation defining a lower body channel between opposing inner wall surfaces, the lower body channel having a lower dentition impression which matingly receives the mandibular teeth of a lower dental arch, and at least one node disposed on the lower body base outer surface, the at least one node disposed to engage upper body outer surface upon receipt of the maxillary teeth of the upper dental arch in the upper body channel and receipt of the mandibular teeth of the lower dental arch in the lower body channel.

Another broad object of the present invention can be to provide a method of making an oral appliance including one or more of: joining a maxillary labial wall and a maxillary lingual wall to an upper body base in spaced apart relation defining an upper body channel between opposing inner wall surfaces, the upper body channel having an upper dentition impression which matingly receives the maxillary teeth of an upper dental arch, and joining a mandibular labial wall and a mandibular lingual wall to a lower body base in spaced apart relation defining a lower body channel between opposing inner wall surfaces, the lower body channel having a lower dentition impression which matingly receives the mandibular teeth of a lower dental arch, and disposing at least one node on a lower body base outer surface, the at least one node disposed to engage the upper body base outer surface upon receipt of the maxillary teeth of an upper dental arch in the upper body channel and receipt of the mandibular teeth of a lower dental arch in the lower body channel.

Another broad object of the present invention can be to provide a method of using an oral appliance including one or more of: engaging a maxillary dental arch to an upper dentition impression in an upper body channel of an upper body of the oral appliance, the upper body including an arcuate upper body base joining a maxillary labial wall and a maxillary lingual wall in spaced apart relation defining the upper body channel, and engaging the mandibular dental arch to a lower dentition impression in a lower body channel of the lower body of the oral appliance, the lower body including an arcuate lower body base joining a mandibular labial wall and a mandibular lingual wall in spaced apart relation defining the lower body channel, the arcuate lower body base having at least one node on a lower body base outer surface, and engaging the at least one node to the upper body base outer surface.

Naturally, further objects of the invention are disclosed throughout other areas of the specification, drawings, photographs, and claims.

III. BRIEF DESCRIPTION OF THE DRAWINGS

Figure 10:
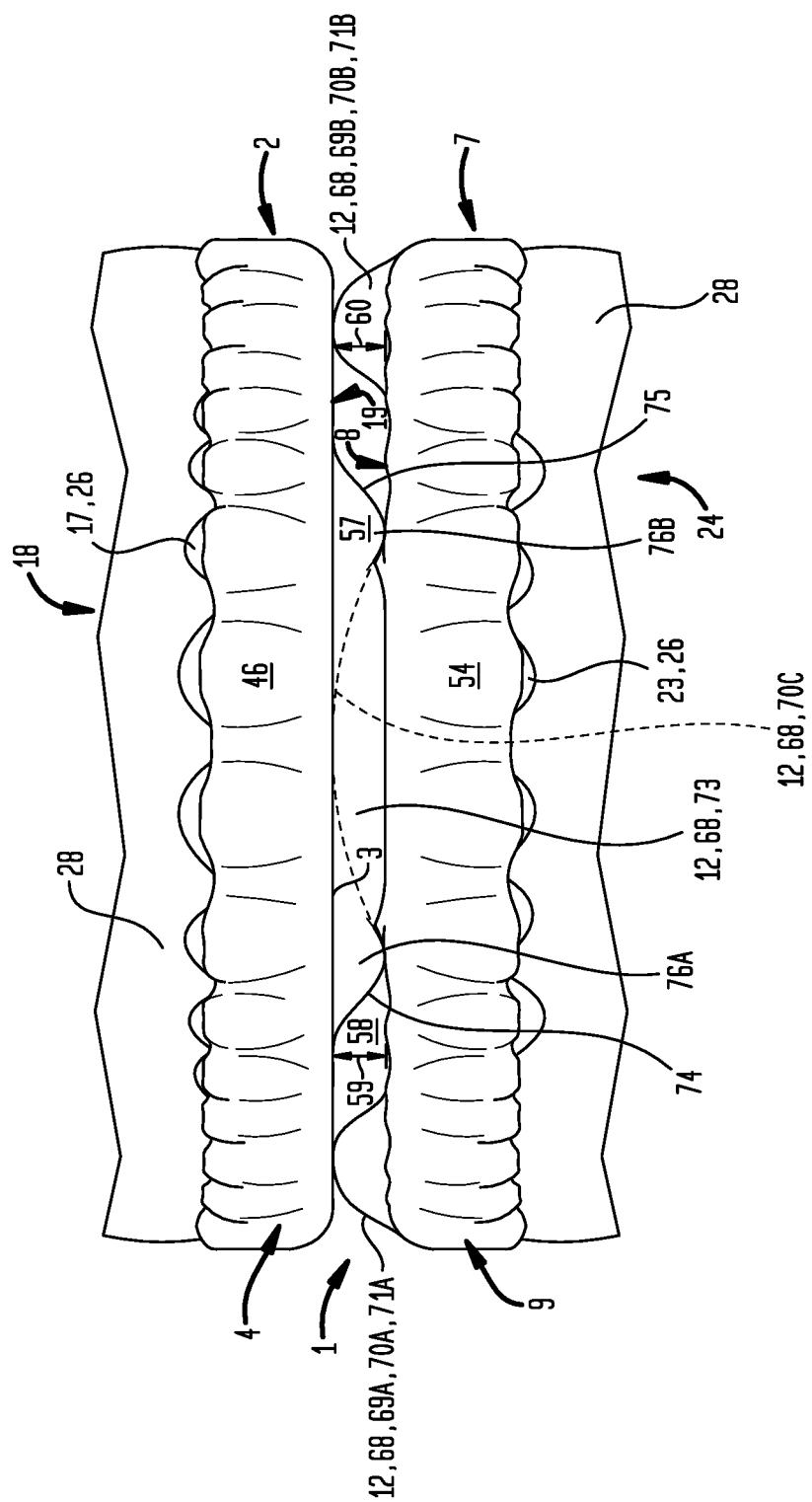

FIG. 10 is a front elevation view of a particular embodiment of an oral appliance including an upper body which matingly receives maxillary teeth of an upper dental arch and a lower body which matingly receives mandibular teeth of a lower dental arch with an elongate node disposed on the upper body, and a node disposed on each of an anterior medial portion, a left posterior portion, and a right posterior portion of a lower body.

Figure 11:
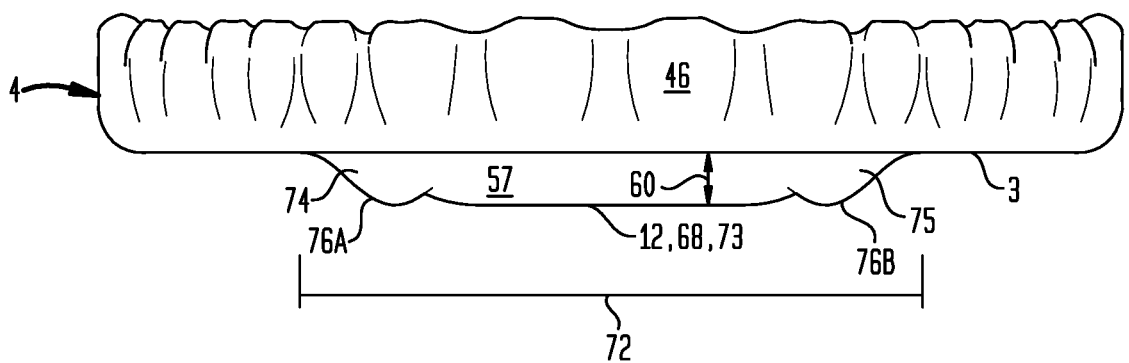

FIG. 11 is a front elevation view of a particular embodiment of an upper body including an elongate node disposed between a pair of nodes on the anterior medial portion of the upper body base outer surface.

Figure 12:
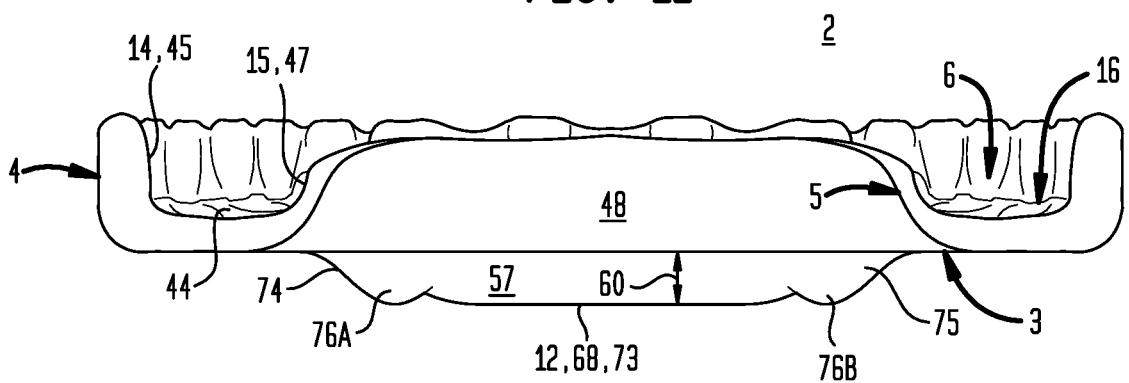

FIG. 12 is a back elevation view of a particular embodiment of an upper body including an elongate node disposed between a pair of nodes on the anterior medial portion of the upper body base outer surface.

Figure 13:
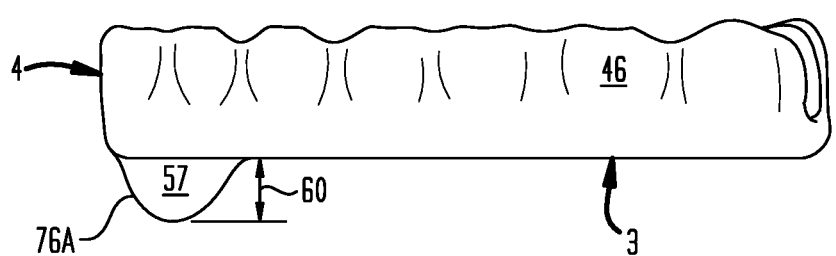

FIG. 13 is a side elevation view of a particular embodiment of an upper body including an elongate node disposed between a pair of nodes on the anterior medial portion of the upper body base outer surface.

Figure 14:
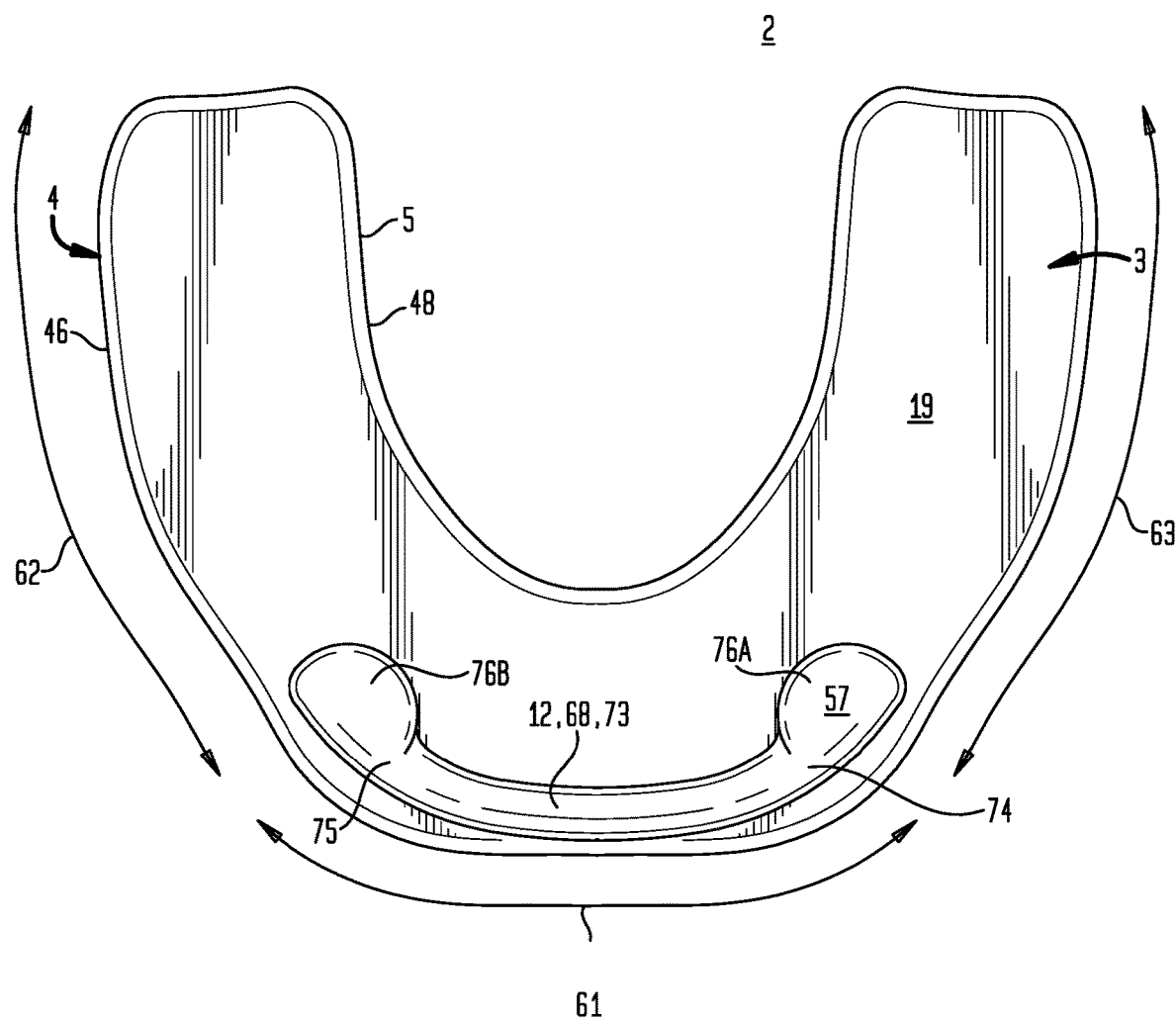

FIG. 14 is a top plan view of a particular embodiment of an upper body including an elongate node disposed between a pair of nodes on the anterior medial portion of the upper body base outer surface.

Figure 15:
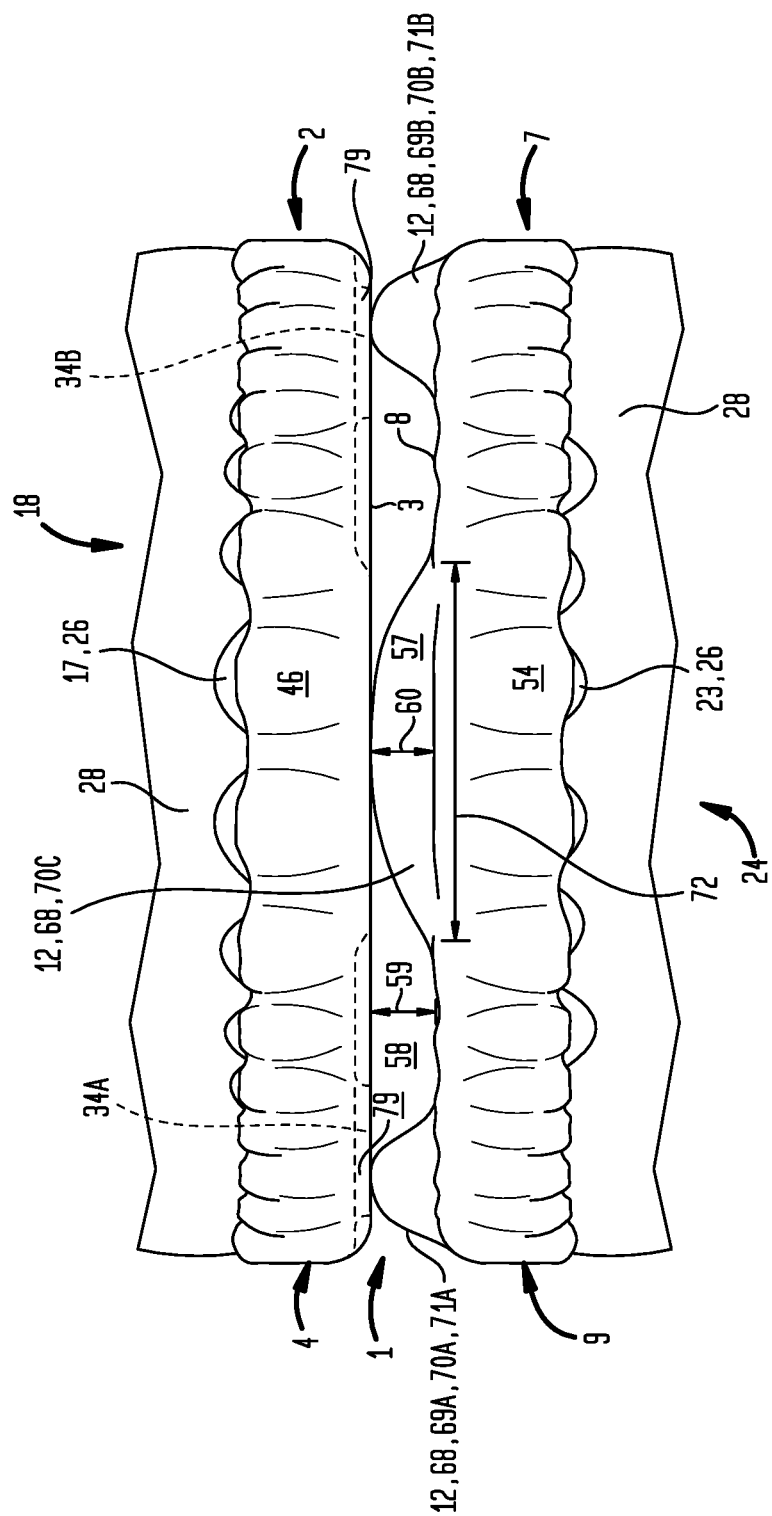

FIG. 15 is a front elevation view of a particular embodiment of an oral appliance including an upper body which matingly receives maxillary teeth of an upper dental arch and a lower body which matingly receives mandibular teeth of a lower dental arch with a node disposed on each of an anterior medial portion, a left posterior portion, and a right posterior portion of a lower body, and an upper body having a pair of daises disposed on the upper body base outer surface to correspondingly contact the nodes disposed on the left posterior portion and the right posterior portion of the lower body.

Figure 16:
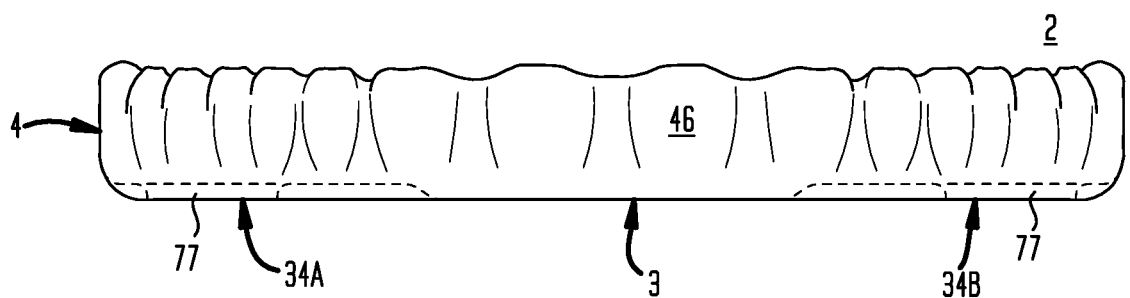

FIG. 16 is a front elevation view of a particular embodiment of an upper body having a pair of daises disposed on the upper body outer surface to correspondingly contact the nodes disposed on the left posterior portion and the right posterior portion of the lower body.

Figure 17:
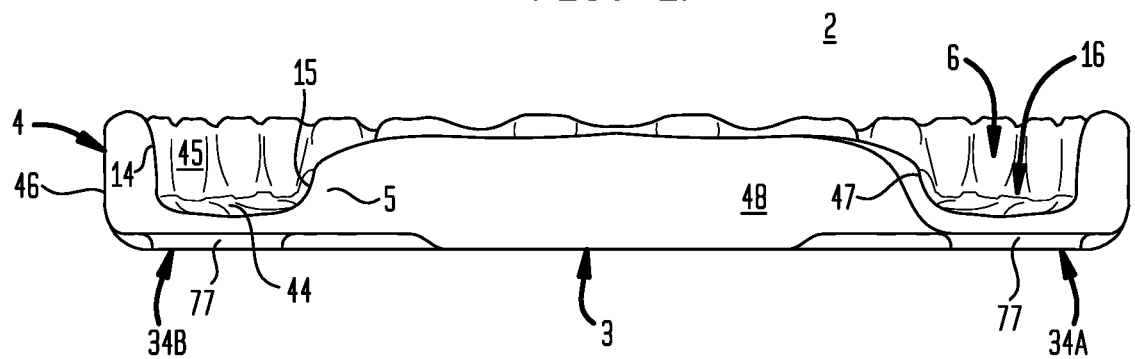

FIG. 17 is a back elevation view of a particular embodiment of an upper body having a pair of daises disposed on the upper body base outer surface to correspondingly contact the nodes disposed on the left posterior portion and the right posterior portion of the lower body.

Figure 18:
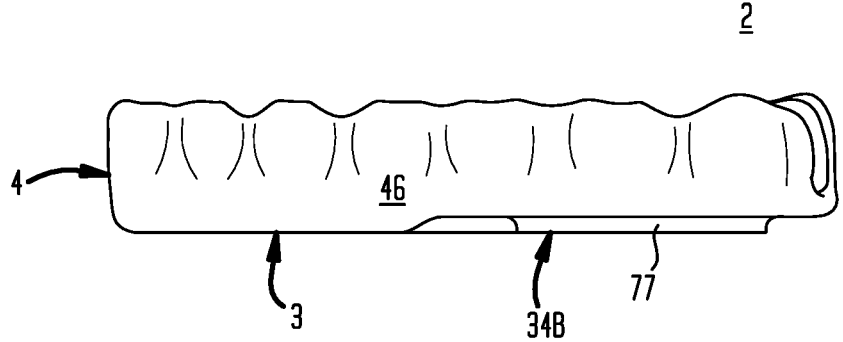

FIG. 18 is a side elevation view of a particular embodiment of an upper body having a pair of daises disposed on the upper body base outer surface to correspondingly contact the nodes disposed on the left posterior portion and the right posterior portion of the lower body.

Figure 19:
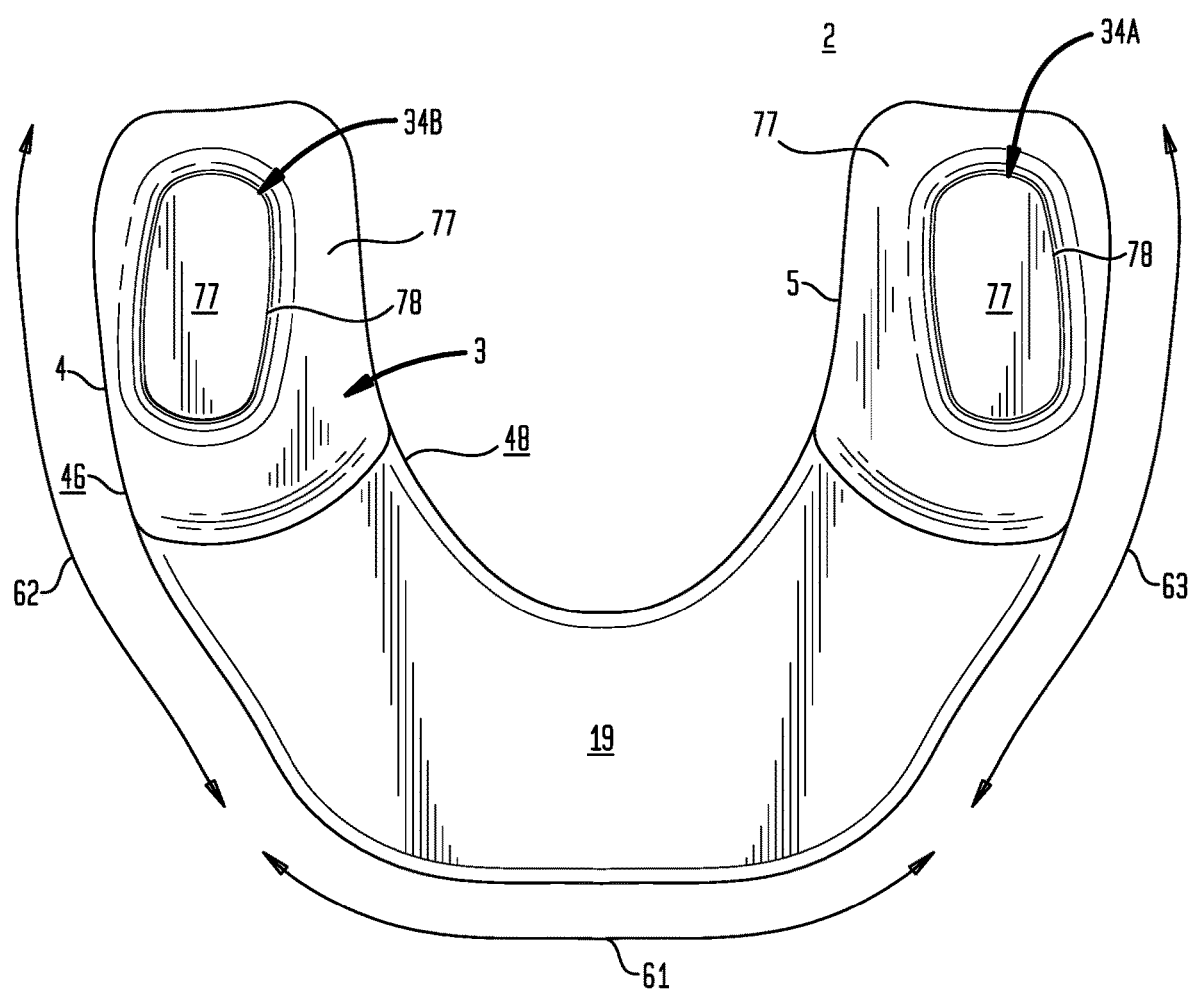

FIG. 19 is a bottom plan view of a particular embodiment of an upper body having a pair of daises disposed on the upper body base outer surface to correspondingly contact the nodes disposed on the left posterior portion and the right posterior portion of the lower body.

Figure 20:
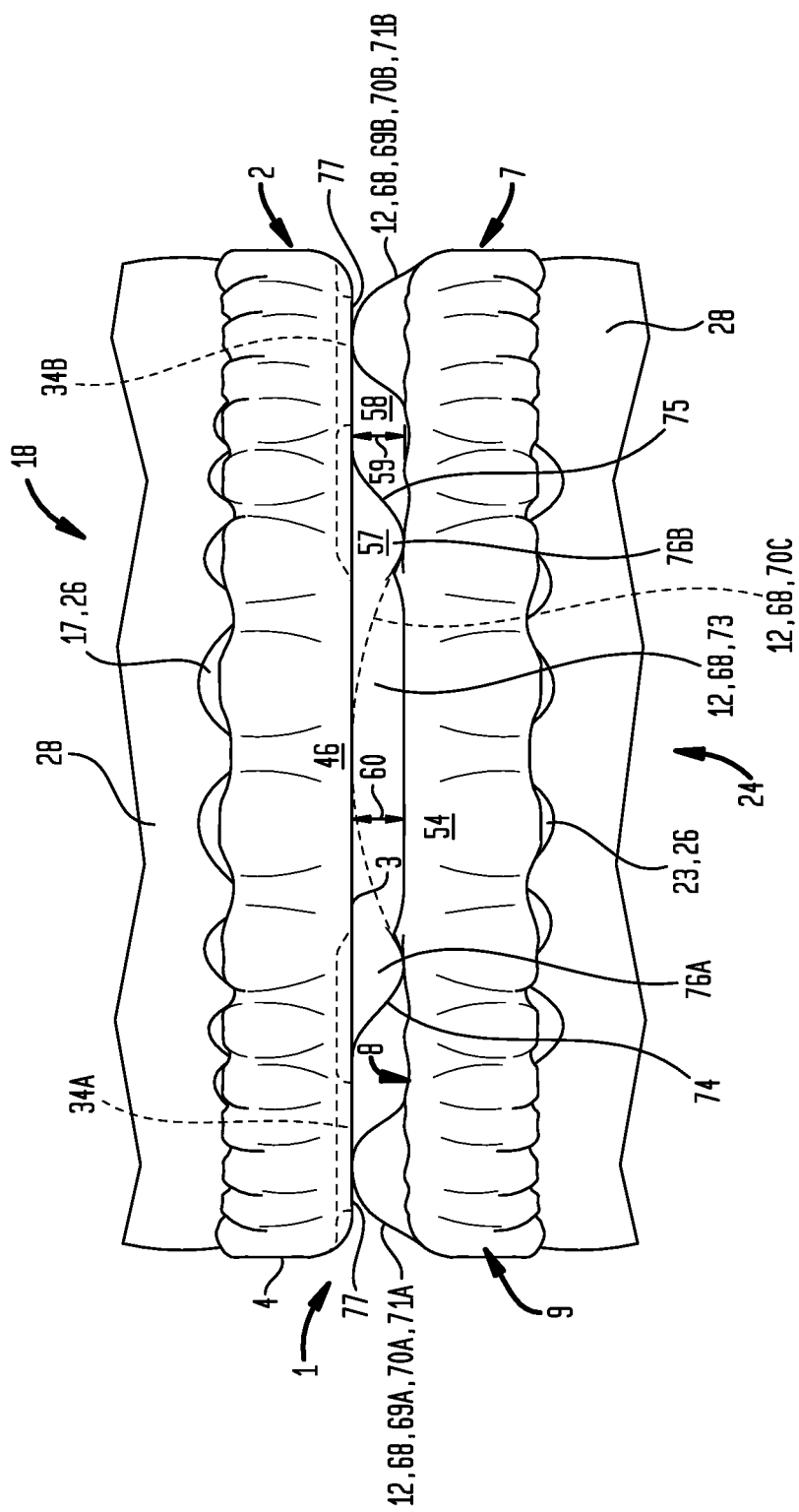

FIG. 20 is a front elevation view of a particular embodiment of an oral appliance including an upper body which matingly receives maxillary teeth of an upper dental arch and a lower body which matingly receives mandibular teeth of a lower dental arch with an elongate node disposed between a pair of nodes on the anterior medial portion of the upper body base outer surface and a pair of daises correspondingly disposed on the left and right posterior portions of the upper body base outer surface, and a node disposed on each of an anterior medial portion, a left posterior portion, and a right posterior portion of a lower body.

Figure 21:
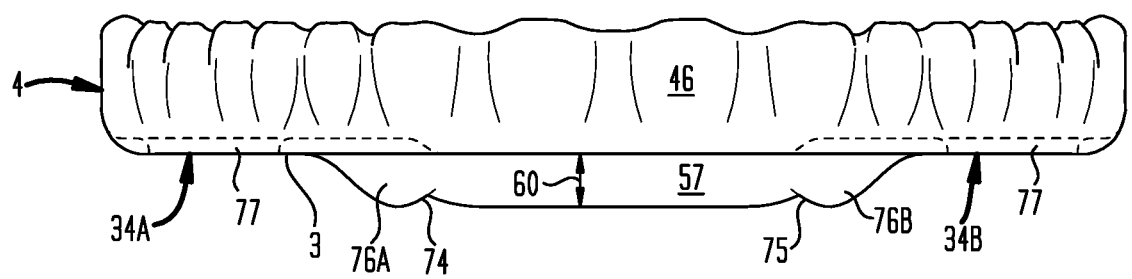

FIG. 21 is a front elevation view of a particular embodiment of an upper body including an elongate node disposed between a pair of nodes on the anterior medial portion of the upper body base outer surface and a pair of daises disposed on the upper body base outer surface to correspondingly receive the nodes correspondingly disposed on the left posterior portion and the right posterior portion of the lower body base outer surface.

Figure 22:
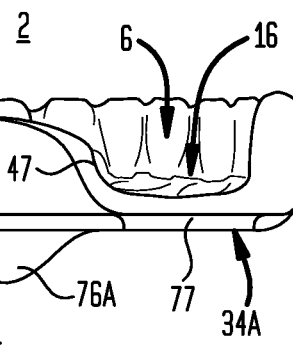

FIG. 22 is a back elevation view of a particular embodiment of an upper body including an elongate node disposed between a pair of nodes on the anterior medial portion of the upper body base outer surface and a pair of daises disposed on the upper body base outer surface to correspondingly contact the nodes correspondingly disposed on the left posterior portion and the right posterior portion of the lower body base outer surface .

Figure 23:
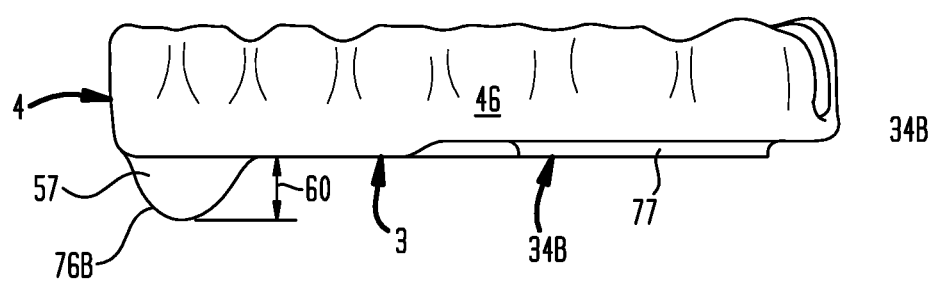

FIG. 23 is a side elevation view of a particular embodiment of an upper body including an elongate node disposed between a pair of nodes on the anterior medial portion of the upper body base outer surface and a pair of daises disposed on the upper body base outer surface to correspondingly contact the nodes correspondingly disposed on the left posterior portion and the right posterior portion of the lower body base outer surface.

Figure 24:
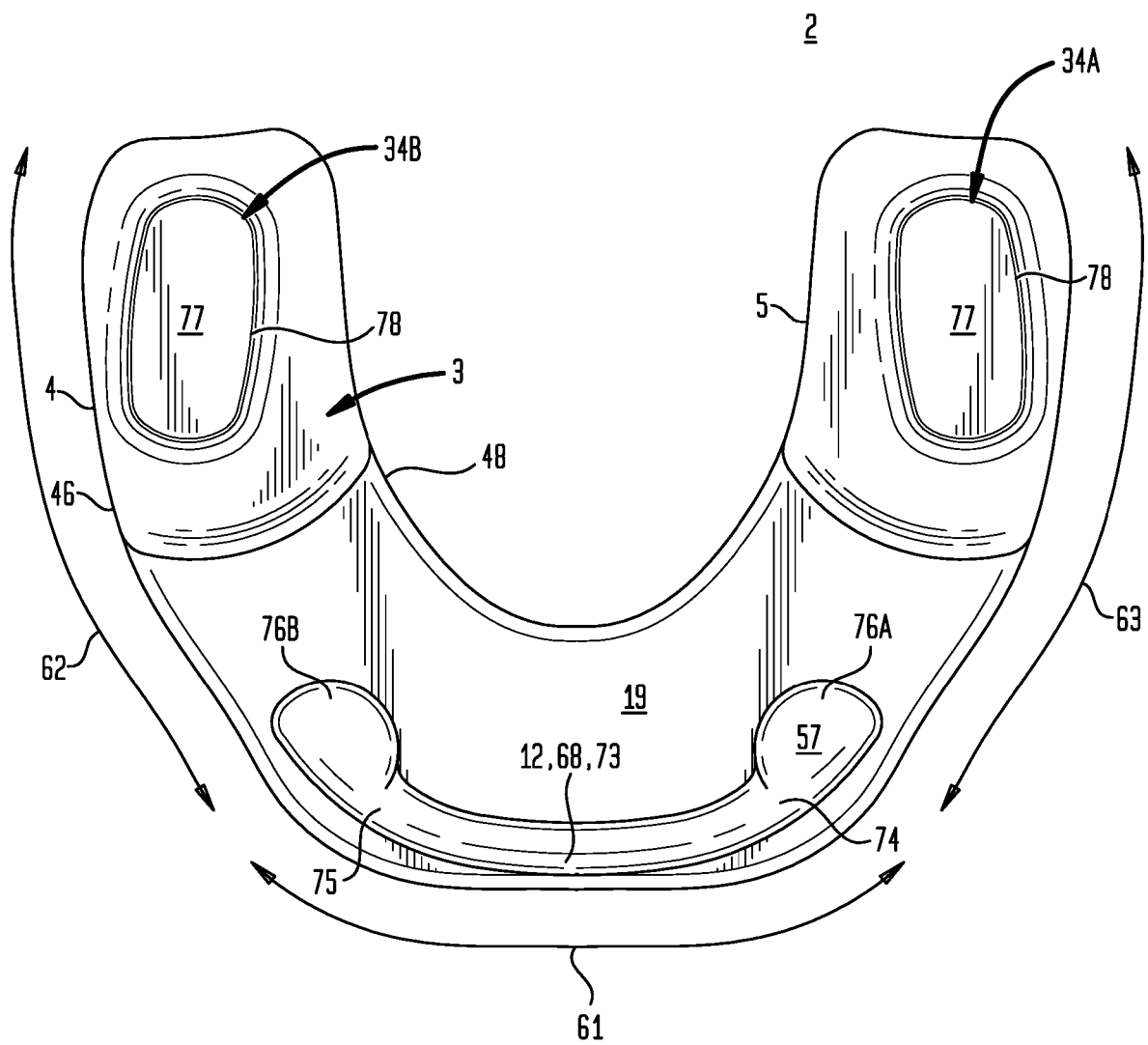

FIG. 24 is a bottom plan view of a particular embodiment of an upper body including an elongate node disposed between a pair of nodes on the anterior medial portion of the upper body base outer surface and a pair of daises disposed on the upper body base outer surface to correspondingly contact the nodes correspondingly disposed on the left posterior portion and the right posterior portion of the lower body base outer surface.

Figure 25:
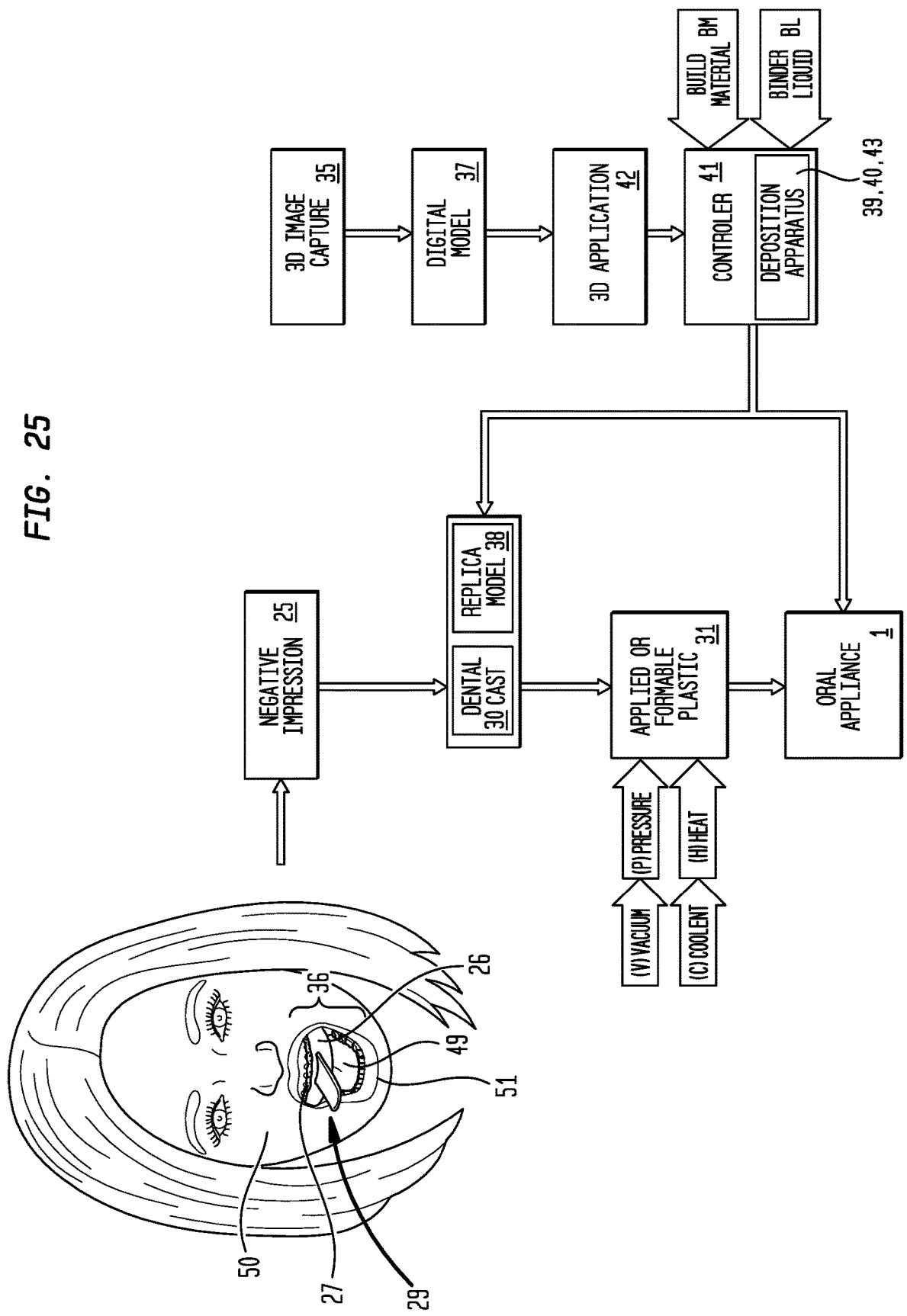

FIG. 25 is a block flow diagram of methods to make embodiments of an oral appliance.

IV. DETAILED DESCRIPTION OF THE INVENTION

Generally, referring to FIGS. 1 through 25, embodiments of an oral appliance (1) can include one or both of an upper body (2) having an arcuate upper body base (3) joining a maxillary labial wall (4) and a maxillary lingual wall (5) in spaced apart relation defining an upper body channel (6) and a lower body (7) having an arcuate lower body base (8) joining a mandibular labial wall (9) and a mandibular lingual wall (10) in spaced apart relation defining a lower body channel (11) with at least one node (12) disposed on a lower body base outer surface (13).

Again referring generally to FIGS. 1 through 25, embodiments of particular methods of making the oral appliance (1) can include joining a maxillary labial wall (4) and a maxillary lingual wall (5) to an upper body base (3) in spaced apart relation defining an upper body channel (6) between opposing inner wall surfaces (14)(15), wherein the upper body channel (6) has an upper dentition impression (16) which matingly receives the maxillary teeth (17) of an upper dental arch (18), wherein said arcuate upper body base (3) has a generally flat upper body base outer surface (19). The method further including joining a mandibular labial wall (9) and a mandibular lingual wall (10) to a lower body base (8) in spaced apart relation defining a lower body channel (11) between opposing inner wall surfaces (20)(21), the lower body channel having a lower dentition impression (22) which matingly receives mandibular teeth (23) of a lower dental arch (24). The method further including disposing at least one node (12) on the lower body base outer surface (13), wherein the at least one node (12) disposed on the lower body base outer surface (13) to engage the generally flat upper body base outer surface (19) upon receipt of the maxillary teeth (17) of an upper dental arch (18) in the upper body channel (6) and receipt of the mandibular teeth (23) of the lower dental arch (24) in said lower body channel (11).

Now referring primarily to FIG. 25, the method can further include making a negative impression (25) of the dentition (26) (for purposes of this description, the term "dentition" also means "teeth") of the mandibular teeth (23) of the lower dental arch (24) and the maxillary teeth (17) of the upper dental arch (18) in a dental impression material (27). The negative impression (25) provides a negative imprint of the dentition (26) of the upper dental arch (18), the dentition (26) of the lower dental arch (24), and the surrounding soft tissues (28) in the mouth (29). An example of a dental impression material (27) useful in embodiments of the method can include or consist of polyvinyl siloxane. The method can further include, producing a dental cast (30), or positive reproduction, of the upper dental arch (18), the lower dental arch (24), and the surrounding soft tissues (28) from the negative impression (25) of the respective dentition (26).

As an illustrative example, a method of making particular embodiments of the oral appliance (1) can include disposing a formable, thermoformable, or thermosetting plastic (31), or a combination thereof, on a dental cast (30) of the upper dental arch (18) or the lower dental arch (24), and the corresponding surrounding soft tissues (28). Illustrative examples of thermosetting plastics can include or consist of, any one or more of polystyrene resin, polyurethane resin, epoxy resin, polyester resin, acrylic resin, vinyl ester resin, or silicone resin or related compounds which can be admixed with a curing agent, such as one or more amines or peroxides, to polymerize the resin to provide a hardened oral appliance (1). One or more of heat (H), vacuum (V), or pressure (P) can be applied to the formable, thermoformable, or thermosetting plastic (31) to allow or assist in applying, forming or curing the formable, thermoformable, or thermosetting plastic (31) to the configuration of the dental cast (30). In particular embodiments, as the formable or thermoformed plastic (31) sets on the dental cast (30), rapid cooling can, but need not necessarily, be achieved by applying a coolant (C) to the oral appliance (1), such as a flow of cool air or water. The formable or thermoformable plastic (31) can be selected from the group consisting of CLEAR-splint™, acrylic, ProForm®, a thermoplastic, or combinations thereof.

The formable, thermoformable, or thermosetting plastic (31), or combinations thereof, can be disposed or formed about the dental cast (30) to impart the upper dentition impression (16) in the upper body (2) which matingly receives maxillary teeth (17) of an upper dental arch (18) and to impart the lower dentition impression (22) in the lower body (7) which matingly receives mandibular teeth (23) of the lower dental arch (24). In particular embodiments, the method can further include disposing one or more nodes (12) on a lower body base outer surface (13) which engage a generally flat upper body base outer surface (19) upon receipt of the maxillary teeth (17) of an upper dental arch (18) in the upper body channel (6) of the upper body (2) and receipt of the mandibular teeth (23) of a lower dental arch (24) in the lower body channel (11) of the lower body (7), as further described below. In particular embodiments, the method can further include disposing one or more nodes (12) or one or more daises (34) on the upper body base outer surface (19), as further described below.

Again, referring primarily to FIG. 25, as a further illustrative example, a method of making particular embodiments of an oral appliance (1) can include three-dimensional scanning or imaging (35) of the dental arch (36) using optical technologies such as: confocal laser microscopy, active wavefront sampling, accordion fringe inferometry, and optical coherent tomography to generate a digital model (37) of a dental arch (36). The method can further include use of an additive build up process, to produce the replica model (38) of a dental arch (36) which can be utilized as, or in substitution or replacement of, the dental cast (30), above described, followed by disposing thermoformable plastic (31) or by applying a layer of polymer on the replica model (38) to form embodiments of the oral appliance (1).

The term "additive build up process" for the purposes of this invention means any process of layering one or more materials to produce a three-dimensional object, and without limiting the breadth of the foregoing, particular embodiments of the additive build up process can, but need not necessarily, include the conventional process referred to as three-dimensional printing ("3D printing") in which the three-dimensional object can be created from a digital model using a three-dimensional materials deposition apparatus, such as a three-dimensional printer, laying down successive layers of a build material.

The term "three-dimensional object" for the purposes of this invention means any configuration of a three-dimensional object, and without limiting the breadth of the forgoing, includes replica models (38) of a dental arch (36) or embodiments of the oral appliance (1).

Again referring to FIG. 25, as a further illustrative example of making embodiments of the oral appliance (1), the digital model (37) obtained by three-dimensional scanning or imaging (35) of the dental arch (36) provides a data representation of the dental arch (36) from which embodiments of the oral appliance (1) can be directly rendered in tangible form by operation of the three-dimensional materials deposition apparatus (39) or materials printer (40). As to particular embodiments of the invention, a materials deposition apparatus controller (41) can run a three-dimensional object production application (42) which reads the digital model files, accepts parameter and preference input from the user, performs a series of detailed calculations and transmits to the three-dimensional materials deposition apparatus (39) (which as to particular embodiments can be a three dimensional printer such as a Form 2350® available from Formlabs, Inc., or a three-dimensional printer assembly as described in U.S. Pat. No. 7,037,382, hereby incorporated by reference herein, or similar apparatus) commands and provides information needed to directly produce embodiments of the oral appliance (1).

In particular, the three-dimensional object production application (42) may allow the user to arrange one or more digital models (37) in a virtual volume representing the actual fabrication space within the three-dimensional materials deposition apparatus (39). The three-dimensional object production application (42) can then slice the array of digital models (37) into a plurality of layers, each of a predetermined thickness, which are transmitted to control electronics housed within the three-dimensional materials deposition apparatus (39).

Particular embodiments of the three-dimensional materials deposition apparatus (39) can, but need not necessarily, comprise a three-dimensional printer (43) having an array object type print heads which deposit a binder liquid (BL) onto successive layers of a build material. Where the binder liquid (BL) combines with the build material, the powder reacts and hardens. By controlling the placement of binder liquid (BL) from these print heads, the configuration of the replica model (38) or oral appliance (1) can be physically reproduced by an additive build up process. Further details of binding a build material with a binder liquid to form a replica model (38) or oral appliance (1) are disclosed in U.S. Pat. Nos. 5,340,656 and 5,387,380, hereby incorporated by reference herein.

In particular embodiments, the build material (BM) can comprise methacrylic acid esters, or a combination of methacrylic acid esters and phosphine oxides as a photoinitiator which when exposed to ultraviolet light initiates hardening of the methacrylic acid esters (for example, Dental SG Resin liquid available from Formlabs, Inc.). A three-dimensional object of the present invention, including embodiments of the replica model (38) of the dental arch (36), or embodiments of the oral appliance (1) may be built using these build materials deposited in successive layers using a three-dimensional printing system similar to various embodiments of U.S. Pat. Nos. 6,658,314, 7,604,768 or 7,500,846, each hereby incorporated by reference herein.

In particular embodiments, the build material can comprise a plastic filament. The plastic filament can, for example, comprise acrylonitrile butadiene styrene (ABS) or polylactic acid (PLA) provided as strands of filament of about one millimeter to about three millimeters in diameter that unwind from a coil or spool. The three-dimensional materials deposition apparatus (39) can comprise a fused deposition modeling (FDM) or, more generally, fused filament fabrication (FFF) printer. The plastic filament can be supplied to a print head with an extrusion nozzle, such as a gear which pulls the plastic filament off the spool and into the extrusion nozzle. The extrusion nozzle can be adapted to regulate flow between on and off. The extrusion nozzle (or an upstream portion of the print head) is heated to melt the plastic filament as it is passed into, or through, the extrusion nozzle so that it liquefies. The pointed extrusion nozzle deposits the liquefied material in lines (for example, in lines that are about 0.1 millimeters across).

As to particular embodiments, the build material(s) used in the additive build up process of embodiments of the replica model (38) or oral appliance (1), when cured, can, but need not necessarily, have Shore A or Shore D hardness which falls in a wide range of hardnesses. The Shore A hardness can, as an example, be between about 40 to about 100 or a Shore D harness of between about 0 and about 90. However, the above illustrative Shore A or Shore D hardness or the resulting tensile strength is not intended to preclude embodiments which fall outside of these ranges.

Now referring primarily to FIGS. 1 through 9, a particular embodiment of the oral appliance (1) can include an upper body (2) and a lower body (7) having at least one node (12) disposed on the lower body (7). Embodiments of the upper body (2) can include an arcuate upper body base (3) having an upper body base outer surface (19) opposite an upper body base inner surface (44), the upper body base (3) extending to a maxillary labial wall (4) and a maxillary lingual wall (5). The maxillary labial wall (4) can have a maxillary labial wall inner surface (45) opposite a maxillary labial wall outer surface (46). The maxillary lingual wall (5) can have a maxillary lingual wall inner surface (47) opposite a maxillary lingual wall outer surface (48). The upper body base inner surface (44), maxillary labial wall inner surface (45), and maxillary lingual wall inner surface (47) can define an upper body channel (6). The upper body channel (6) can include the negative impression (25) of the maxillary dentition (26) of the upper dental arch (18). The upper body channel (6) can matingly receive the maxillary dentition (26) of the upper dental arch (18). The upper body base outer surface (19) can have a generally flat upper body base outer surface (19).

The upper body channel (6) or either or both of the maxillary lingual wall (5) and the maxillary labial wall (4) can be configured to engage the entirety or a portion of the maxillary dentition (26) of the upper dental arch (18) and the surrounding soft tissues (28).

For purposes of this invention, the term "lingual" refers to a surface abutting or adjacent to (or direction towards) the tongue (49).

For purposes of this invention, the term "labial" refers to a surface opposite the lingual surface adjacent to (or the direction towards) the inside of the cheek (50) or lip (51).

Embodiments of the lower body (7) can include an arcuate lower body base (8). The lower body base (8) can include a lower body base outer surface (13) opposite a lower body base inner surface (52), the lower body base extending to a mandibular labial wall (9) and a mandibular lingual wall (10). The mandibular labial wall (9) can have a mandibular labial wall inner surface (53) opposite a mandibular labial wall outer surface (54). The mandibular lingual wall (10) can have a mandibular lingual wall inner surface (55) opposite a mandibular lingual wall outer surface (56). The lower body base inner surface (52), mandibular labial wall inner surface (53), and mandibular lingual wall inner surface (55) can define a lower body channel (11). The lower body channel (11) can include the negative impression (25) of the mandibular dentition (26) of the lower dental arch (24). The lower body channel (11) can matingly receive the mandibular dentition (26) of the lower dental arch (24). The lower body channel (11) or either or both of the mandibular lingual wall (10) and the mandibular labial wall (9) can be configured to engage the entirety or a portion of the mandibular dentition (26) of the lower dental arch (24) and the surrounding soft tissues (28).

Again, referring to FIGS. 1 through 9, embodiments of the lower body (7) can include at least one node (12) disposed on the lower body base outer surface (13).

For the purposes of this invention the term "node" means a protuberance outwardly extending from an upper or lower body base outer surface (19)(13) disposed to engage the opposing upper or lower body base outer surface (19)(13) upon receipt of the maxillary teeth (17) of an upper dental arch (18) in the upper body channel (6) and receipt of the mandibular teeth (23) of a lower dental arch (24) in the lower body channel (11.

Now referring primarily to FIGS. 2 through 5, in particular embodiments, the at least one node (12) can engage the generally flat upper body base outer surface (19) of the upper body (2) upon receipt of the maxillary dentition (17) of the upper dental arch (18) in the upper body channel (6) and the receipt of the mandibular dentition (26) of the lower dental arch (24) in the lower body channel (11). In particular embodiments, the at least one node (12) can have an arcuate node surface (57) which tangentially engages the generally flat upper body base outer surface (19), while the remainder of the arcuate node surface (57) can be disengaged from the generally flat upper body base outer surface (19).

Accordingly, the engagement of the arcuate node surface (57) to the generally flat upper body base outer surface (19) disposes the upper body base outer surface (19) in spaced apart relation to the lower body base outer surface (13) affording a gap (58) whereby the remainder of the lower body base outer surface (13) and the upper body base outer surface (19) not corresponding to the node (12) do not engage. The width (59) of the gap (58) can be altered by increasing or decreasing the node height (60) of the node (12).

Now, referring primarily to FIGS. 2 through 5, the at least one node (12) can be only one node (12) disposed on the lower body base outer surface (13) at one location, which, depending on the embodiment, can be on the anterior medial portion (61), the left posterior portion (62), or the right posterior portion (63) of the lower body base outer surface (13). In particular embodiments, the only one node (12) can be disposed on the lower body base outer surface (13) over the lower dentition impression (22) of a right second molar (64) of the mandibular teeth (23), or over the lower dentition impression (22) of a left second molar (65) of the mandibular teeth (23), or the lower dentition impression (22) of a left or right central incisor (66)(67) of the mandibular teeth (23).

Figure 1:
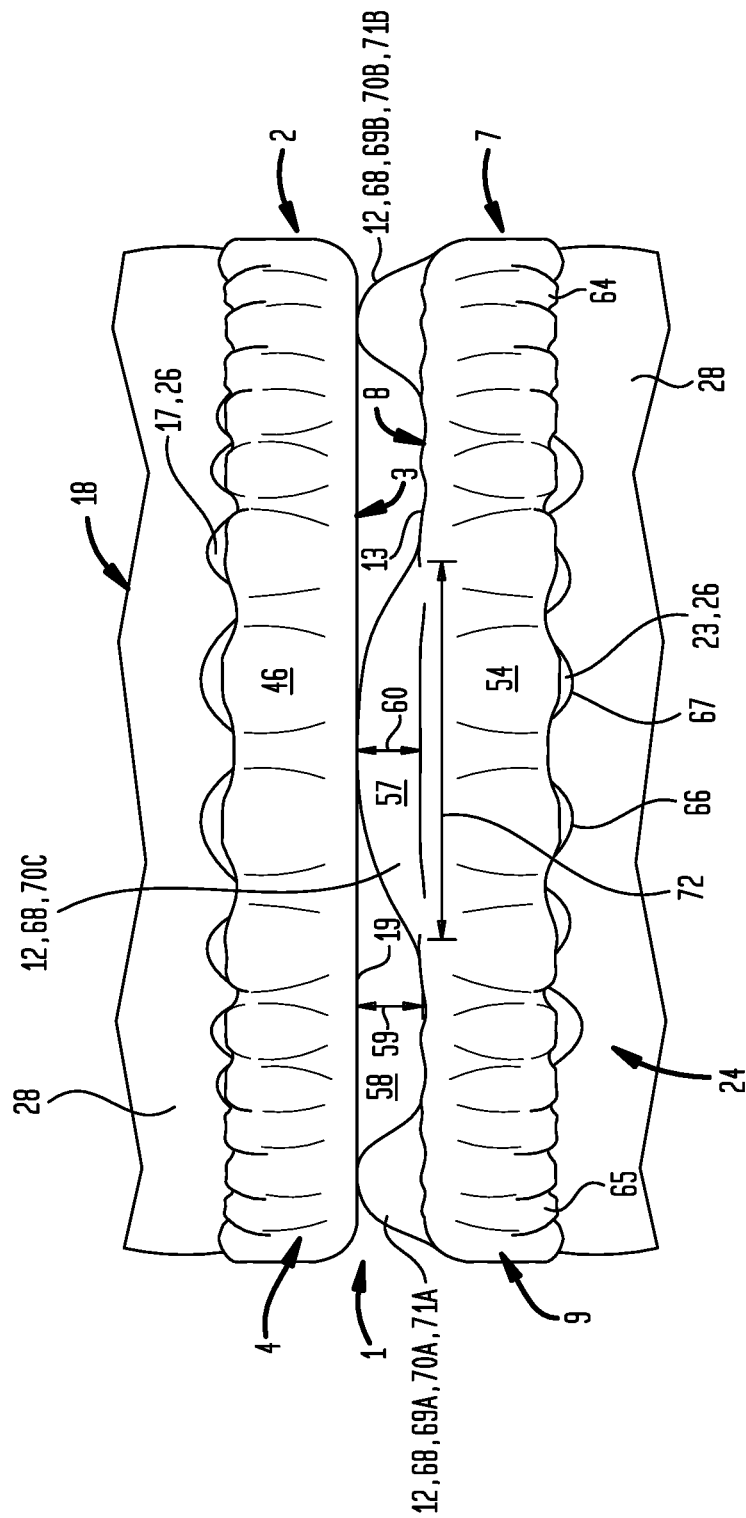
FIG. 1 is a front elevation view of a particular embodiment of an oral appliance including an upper body which matingly receives maxillary teeth of an upper dental arch and a lower body which matingly receives mandibular teeth of a lower dental arch with a node disposed on each of an anterior medial portion, a left posterior portion, and a right posterior portion of the lower body.
Figure 2:
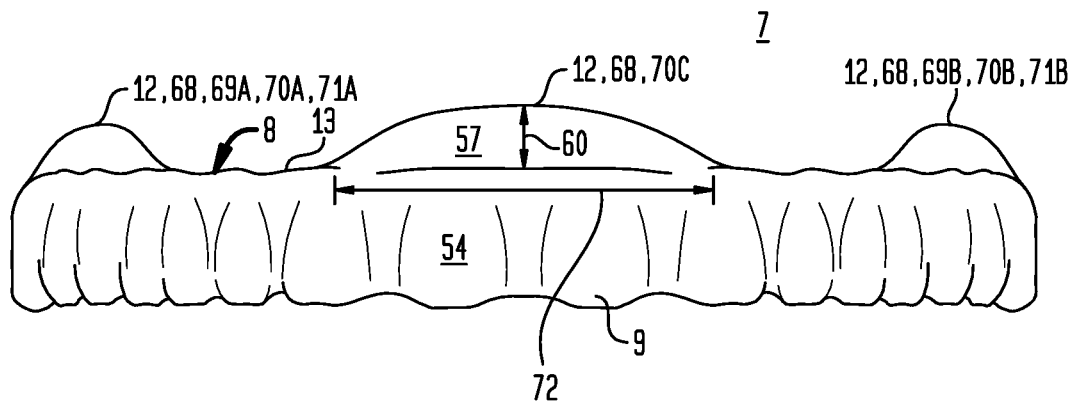
FIG. 2 is a front elevation view of a particular embodiment of a lower body including a node disposed on each of an anterior medial portion, a left posterior portion, and a right posterior portion thereof.
Figure 3:
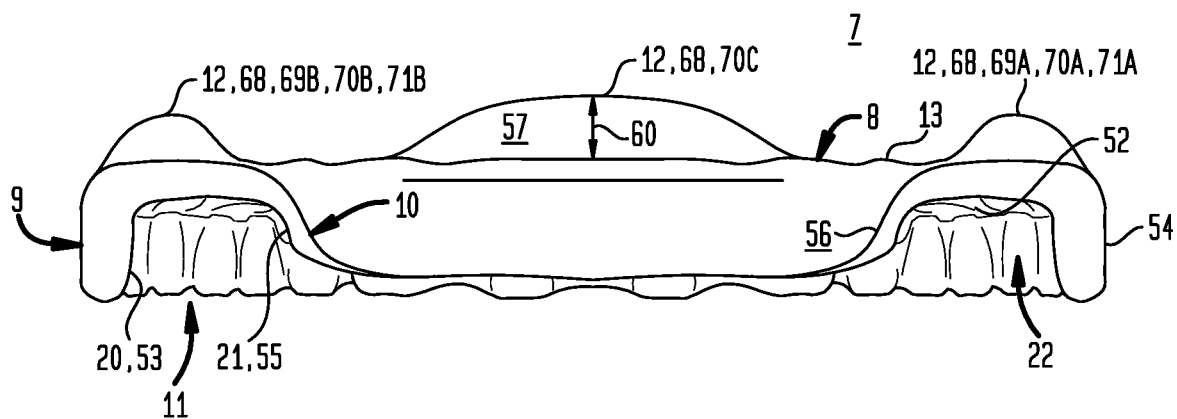
FIG. 3 is a back elevation view of a particular embodiment of a lower body including a node disposed on each of an anterior medial portion, a left posterior portion, and a right posterior portion thereof.
Figure 4:
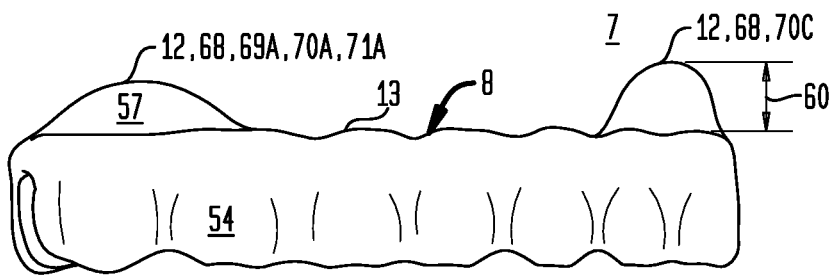
FIG. 4 is a side elevation view of a particular embodiment of a lower body including a node disposed on each of an anterior medial portion, a left posterior portion, and a right posterior portion thereof.
Figure 5:
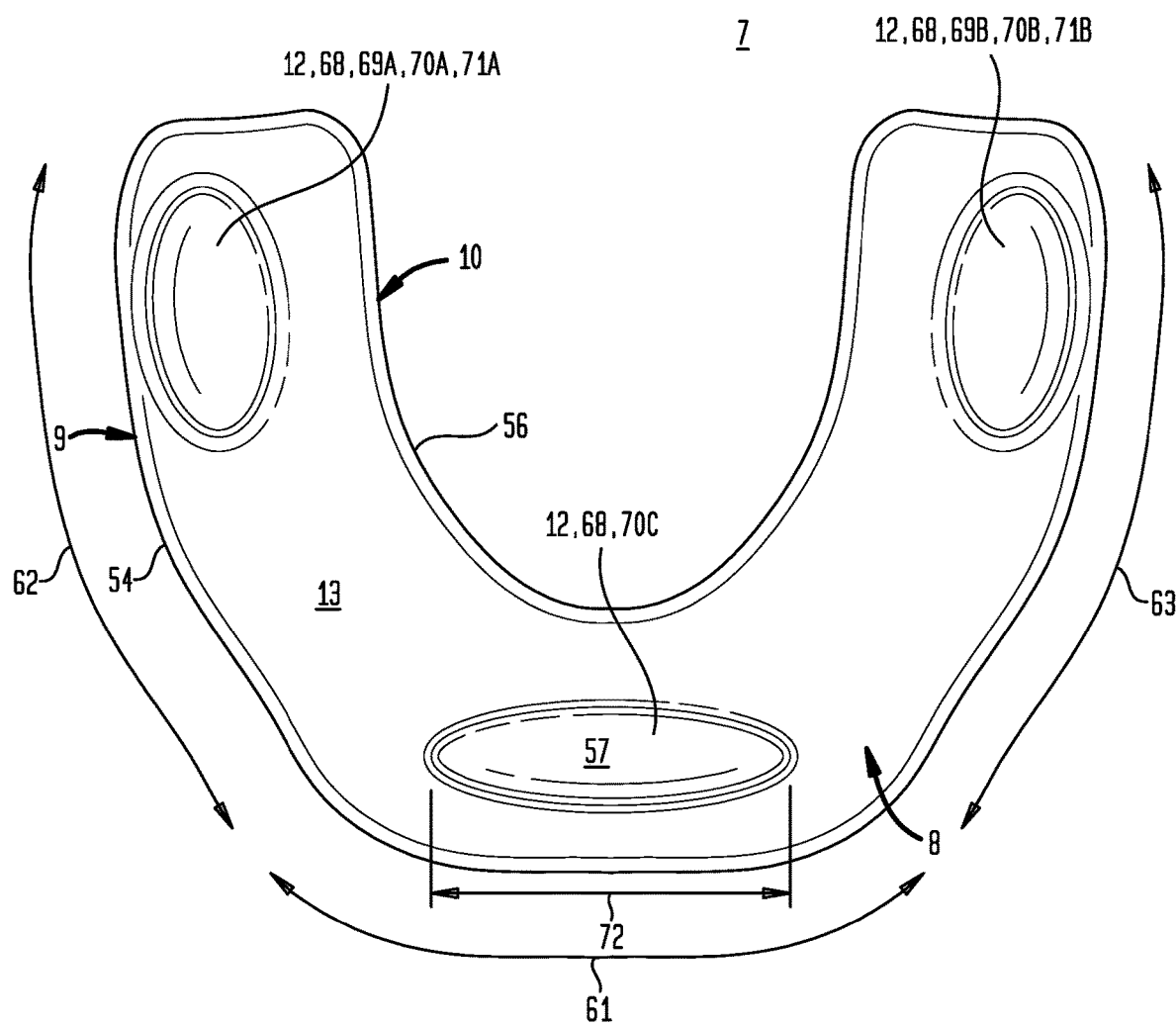
FIG. 5 is a top plan view of a particular embodiment of a lower body including a node disposed on each of an anterior medial portion, a left posterior portion, and a right posterior portion thereof.
Figure 6:
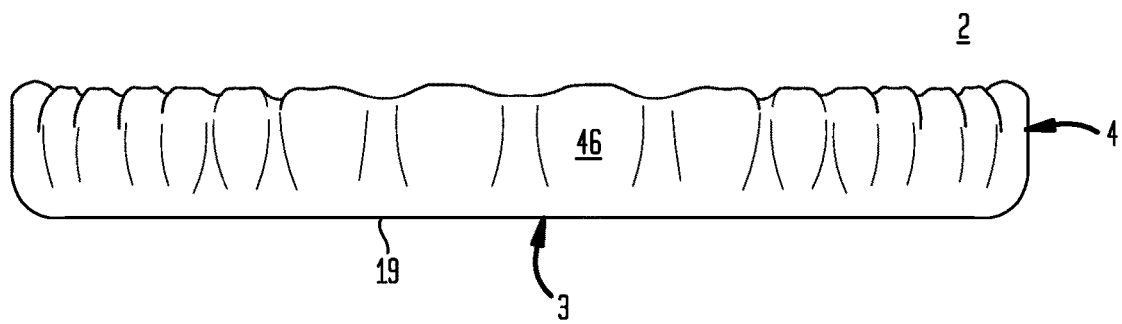
FIG. 6 is a front elevation view of a particular embodiment of an upper body having a generally flat upper body base outer surface.
Figure 7:
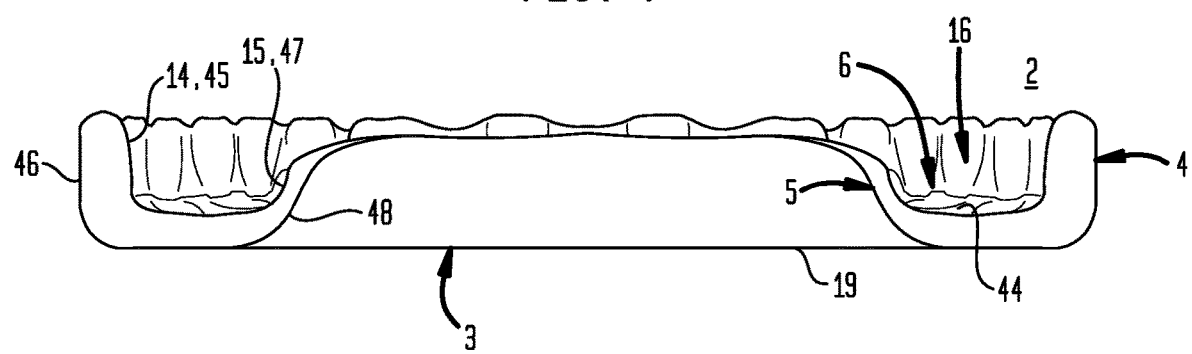
FIG. 7 is a back elevation view of a particular embodiment of an upper body having a generally flat upper body base outer surface.
Figure 8:
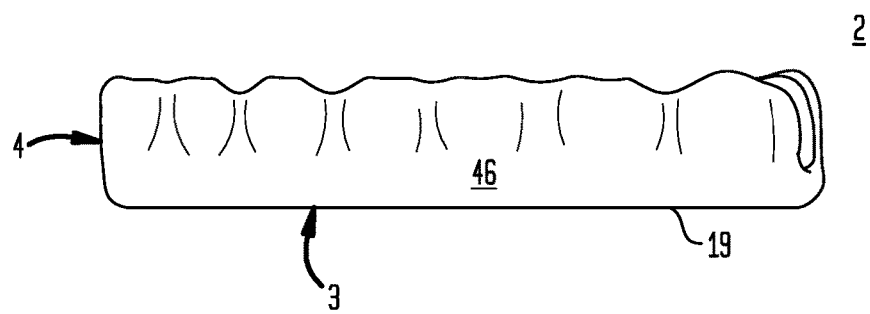
FIG. 8 is a side elevation view of a particular embodiment of an upper body having a generally flat upper body base outer surface.
Figure 9:
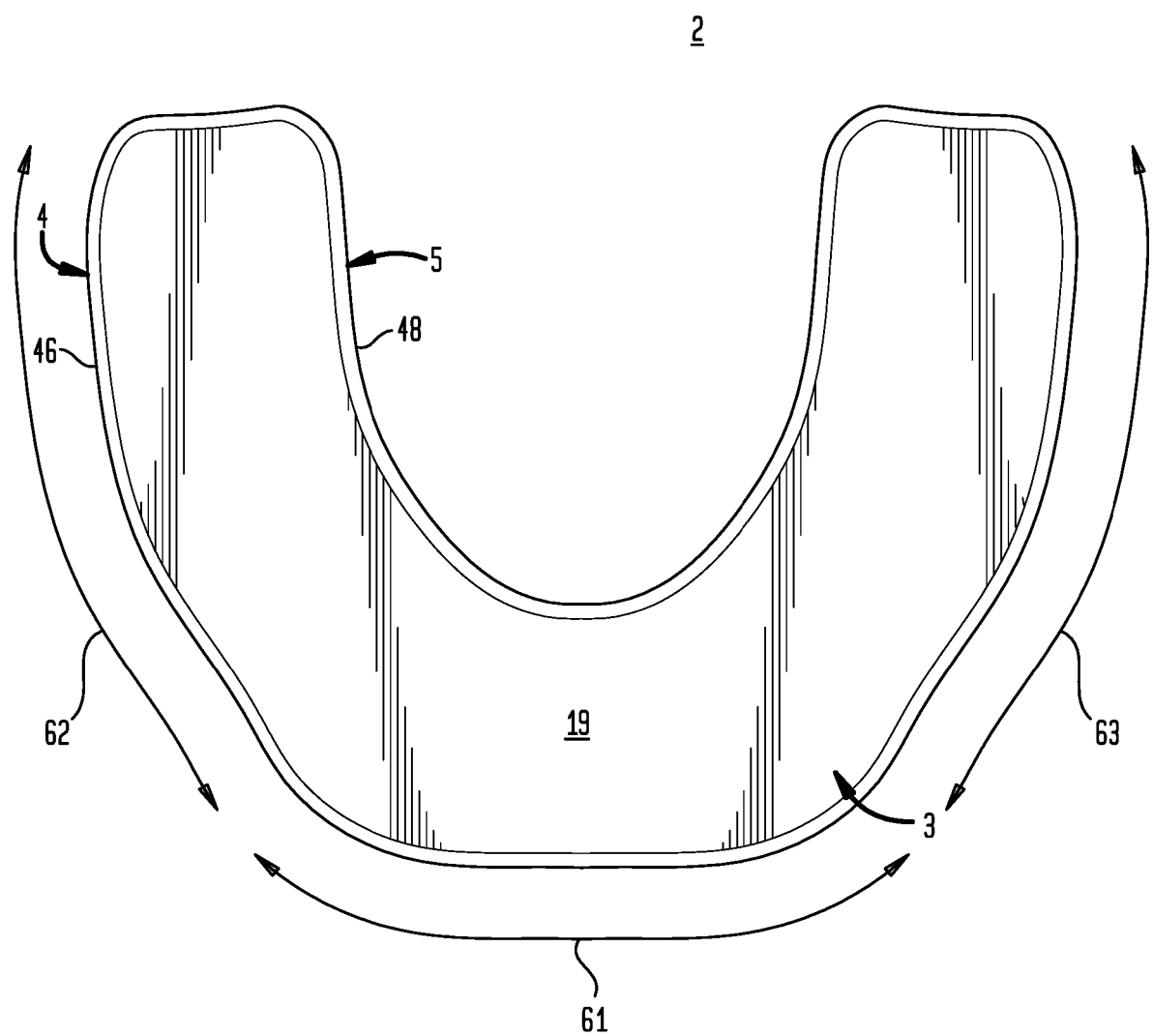
FIG. 9 is a bottom plan view of a particular embodiment of an upper body having a generally flat upper body base outer surface.

Now, with reference primarily to FIG. 5, the at least one node (12) can comprise a plurality of nodes (68). The plurality of nodes (68) can be disposed on the lower body base outer surface (13) at a corresponding plurality of locations on the anterior medial portion (61), the left posterior portion (62), or the right posterior portion (63) of the lower body base outer surface (13), or a combination thereof. The plurality of nodes (68) can have substantially similar or substantially different three-dimensional geometrical shapes. In particular embodiments, the plurality of nodes (68) can be a pair of nodes (69A)(69B). One of the pair of nodes (69A)(69B) can be disposed on the left posterior portion (62) of the lower body base outer surface (13) and one of the pair of nodes (69A)(69B) can be disposed on the right posterior portion (63) of the lower body base outer surface (13); however, this is not to exclude the placement of the pair of nodes (69A)(69B) on other portions of the lower body base outer surface (13).

Again, with reference primarily to FIGS. 2 through 5, in particular embodiments, the plurality of nodes (68) can include three nodes (70A)(70B)(70C). One of the three nodes (70A)(70B)(70C) can be correspondingly disposed on the anterior medial portion (61), the left posterior portion (62), and the right posterior portion (63) of the lower body base outer surface (13). The three nodes (70A)(70B)(70C) can have substantially similar three-dimensional configurations, different three-dimensional geometric configurations, or a combination thereof. In the example of the particular embodiment of FIGS. 1 through 5, two (70A)(70B) of the three nodes (70A)(70B)(70C) can be substantially similar nodes (71A)(71B). The substantially similar nodes (71A)(71B) can be disposed on the left posterior portion (62) and the right posterior portion (63) of the lower body base outer surface (13). The third node (70C) can be disposed on the anterior medial portion (61). The third node (70C) can, but need not necessarily, have a greater length (72) than the two substantially similar nodes (71A)(71B). Each of the three nodes (70A)(70B)(70C) can have a substantially similar node height (60). Upon receipt of the maxillary dentition (26) of the upper dental arch (18) in the upper body channel (6) and the receipt of the mandibular dentition (26) of the lower dental arch (24) in the lower body channel (11), each of the three nodes (70A)(70B)(70C) can engage the generally flat upper body base outer surface (19) as shown in the example of FIGS. 6 through 9.

In other particular embodiments, the plurality of nodes can consist of four nodes. Two of the four nodes (12) can be correspondingly disposed on the anterior medial portion (61), one node on the left posterior portion (62), and one node on the right posterior portion (63) of the lower body base outer surface (13). The two nodes (12) disposed on the anterior medial portion (61) can, but need not necessarily, be substantially similar nodes (12). The two nodes can be respectively disposed over the dentition impression (22) of the left canine and the right canine, the left and right central incisors, or the left and right lateral incisors, or combinations thereof. The four nodes can have substantially similar three-dimensional configurations, different three-dimensional geometric configurations, or a combination thereof. Upon receipt of the maxillary dentition (26) of the upper dental arch (18) in the upper body channel (6) and the receipt of the mandibular dentition (26) of the lower dental arch (24) in the lower body channel (11), each of the four nodes can engage the generally flat upper body base outer surface (19) as shown in the example of FIGS. 6 through 9.

Now referring primarily to FIG. 10 through 14, in particular embodiments, the lower body (7) can include one or more nodes (12) as above described, and the upper body (2) can further include one or a plurality of nodes (68) disposed on the upper body base outer surface (19).

The one or plurality of nodes (68) disposed on the upper body base outer surface (19) can be any geometrical shape which allows the nodes (12) disposed on the lower body (7) to engage the upper body base outer surface (19) upon receipt of the maxillary dentition (26) of the upper dental arch (18) in the upper body channel (6) and the receipt of the mandibular dentition (26) of the lower dental arch (24) in the lower body channel (11).

In particular embodiments, an arcuate node surface (57) can tangentially engage the lower body base outer surface (13), disposing the upper body base outer surface (19) in spaced apart relation to the lower body base outer surface (13) affording a gap (58) whereby the remainder of the lower body base outer surface (13) and the upper body base outer surface (19) not corresponding to the node (12) do not engage. The width (59) of the gap (58) can be altered by increasing or decreasing the node height (60) of the node (12). The node (12) can be disposed on the upper body base outer surface (19) in one or more locations, including the anterior medial portion (61), the left posterior portion (62), or the right posterior portion (63) of the upper body base outer surface (19), or a combination thereof.

Now, referring primarily to FIGS. 11 through 14, in particular embodiments, only an elongate node (73) may be disposed on the anterior medial portion (61) of the upper body base outer surface (19). The elongate node (73) can have a length (72) disposed between an elongate node first end (74) and an elongate node second end (75). In other embodiments, only a pair of nodes (76A)(76B) may be disposed on the anterior medial portion (61) of the upper body base outer surface (19). In other particular embodiments, the elongate node first and second ends (74)(75) can, but need not necessarily, correspondingly connect to the pair of nodes (76A)(76B). The pair of nodes (76A)(76B) disposed on the upper body base outer surface (19) can engage the lower body base outer surface (13) with one of the pair of nodes (76A)(76B) disposed adjacent each end of the elongate node (73) occurring on the anterior medial portion of the upper body base outer surface (13) upon receipt of the maxillary dentition (26) of the upper dental arch (18) in the upper body channel (6) and the receipt of the mandibular dentition (26) of the lower dental arch (24) in the lower body channel (11). In those embodiments including an elongate node (73) disposed on the upper body base outer surface (19), the elongate node (74) can engage the lower body base outer surface (13) anterior to a node (12) disposed on a lower anterior medial portion (61) of the lower body base outer surface (13).

As exemplified in FIG. 10, the oral appliance (1) can include a lower body (7) having nodes (12) disposed on one or more of the left posterior portion (62),the right posterior portion (63), or the anterior medial portion (61) of the lower body base outer surface (13), and an upper body (2) having an elongate node (73) having elongate node first and second ends (74)(75) correspondingly connected to a pair of nodes (76A)(76B) disposed on the upper body base outer surface (19). The respective node heights (60) of the nodes (12) disposed on the lower body base outer surface (13) can be substantially similar to the node heights (60) of the nodes (12) disposed on the upper body base outer surface (19), thereby permitting the nodes (12) disposed on the upper body base outer surface (19) to engage the lower body base outer surface (13) and the nodes (12) disposed on the lower body base outer surface (13) to engage the upper body base outer surface (19) upon receipt of the maxillary dentition (26) of the upper dental arch (18) in the upper body channel (6) and the receipt of the mandibular dentition (26) of the lower dental arch (24) in the lower body channel (11).

Now referring primarily to FIGS. 15 through 19, in particular embodiments, the lower body (7) can include one or more nodes (12), as above described, and the upper body (outer surface (19) can be generally flat as above described, and can further include a recessed area of the left and right posterior portions (62)(63) surrounding a pair of daises (34A)(34B) each having a generally flat outer surface area (77) generally coplanar to the upper body base outer surface (19). The pair of daises (34A)(34B) can each extend to dais perimeter (78) which define a the corresponding dais flat outer surface area (77) which engages all or a part of the corresponding one of the pair of nodes (12) disposed on the left posterior portion (62) and the right posterior portion (63) of the lower body base outer surface (13). In particular embodiments, the pair of daises (34A)(34B) (34A)(34B) can matingly engage the pair of nodes (69A)(69B), in whole or in part, upon receipt of the maxillary dentition (26) of an upper dental arch (18) in the upper body channel (6) and receipt of the mandibular dentition (26) of a lower dental arch (24) in the lower body channel (11).

Now, referring primarily to FIGS. 20 through 24, in particular embodiments, the lower body (7) can include one or more nodes (12), as above described, and the upper body (2) can further include the pair of nodes (76A)(76B) interconnected by the elongate node (73) and the pair of daises (34A)(34B) disposed on the left posterior portion (62) and the right posterior portion (63) of the upper body base outer surface (19), as above described. The upper body (2) and the lower body (7) upon receipt of the maxillary dentition (26) of an upper dental arch (18) in the upper body channel (6) and receipt of the mandibular dentition (26) of a lower dental arch (24) in the lower body channel (11) can correspondingly engage the nodes (12) disposed on the lower body base outer surface (13) with the upper body base outer surface (19) and the pair of daises (034A)(34B) and engage the nodes (12) disposed on the upper body base outer surface (19) with the lower body base outer surface (13), as above described.

As can be easily understood from the foregoing, the basic concepts of the present invention may be embodied in a variety of ways. The invention involves numerous and varied embodiments of an oral appliance and methods for making and using such an oral appliance including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "impression" should be understood to encompass disclosure of the act of "impressing"—whether explicitly discussed or not—and, conversely, were there effectively disclosure of the act of "impressing", such a disclosure should be understood to encompass disclosure of an "impression" or even a "means for impressing." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the oral appliances herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An oral appliance, comprising:
   an upper body including an arcuate upper body base joining a maxillary labial wall and a maxillary lingual wall in spaced apart relation defining an upper body channel between opposing inner wall surfaces, said upper body channel having an upper dentition impression which matingly receives maxillary teeth of an upper dental arch, said arcuate upper body base having an upper body base outer surface, all of said upper body base outer surface essentially entirely flat;
   a lower body including an arcuate lower body base joining a mandibular labial wall and a mandibular lingual wall in spaced apart relation defining a lower body channel between opposing inner wall surfaces, said lower body channel having a lower dentition impression which matingly receives mandibular teeth of a lower dental arch; and
   at least one node disposed on a lower body base outer surface, said at least one node disposed to engage said generally flat upper body outer surface upon receipt of said maxillary teeth of an upper dental arch in said upper body channel and receipt of said mandibular teeth of a lower dental arch in said lower body channel.

2. The oral appliance of claim 1, wherein said at least one node disposed on said lower body base outer surface occurs on one or more of an anterior medial portion of said lower body base outer surface, a left posterior portion of said lower body base outer surface, a right posterior portion of said lower body base outer surface.

3. The oral appliance of claim 1, wherein said at least one node disposed on said lower body base outer surface occurs on an anterior medial portion of said lower body base outer surface.

4. The oral appliance of claim 1, wherein said at least one node disposed on said lower body base outer surface occurs on one of a left posterior portion of said lower body base outer surface or a right posterior portion of said lower body base outer surface.

5. The oral appliance of claim 1, wherein said at least one node disposed on said lower body base outer surface comprises a pair of nodes, one occurring on a left posterior portion of said lower body base outer surface and one occurring on a right posterior portion of said lower body base outer surface.

6. The oral appliance of claim 5, wherein said at least one node disposed on said lower body base outer surface comprises three nodes, one correspondingly occurring over said lower dentition impression of a right second molar of said mandibular teeth, said lower dentition impression of a left second molar of said mandibular teeth, and said lower dentition impression of a left or right central incisor of said mandibular teeth.

7. The oral appliance of claim 5, wherein said at least one node disposed on said lower body base outer surface consists of three nodes, one correspondingly occurring over said lower dentition impression of a right second molar of said mandibular teeth, said lower dentition impression of a left second molar of said mandibular teeth, and said lower dentition impression of a left or right central incisor of said mandibular teeth.

8. The oral appliance of claim 1, wherein said at least one node disposed on said lower body base outer surface comprises a plurality of nodes one of said plurality of nodes disposed on said left posterior portion of said lower body base outer surface and one occurring on a right posterior portion of said lower body base outer surface and one of said plurality of nodes occurring on an anterior medial portion of said lower body base outer surface.

9. The oral appliance of claim 8, wherein said plurality of nodes have an arcuate external surface.

10. The oral appliance of claim 1, wherein said lower body comprises a material selected from the group consisting of: CLEARsplint™, acrylic, ProForm®, a thermoplastic, or combination thereof.

11. The oral appliance of claim 1, wherein said at least one node disposed on said lower body base outer surface consists of a node occurring on an anterior medial portion of said lower body base outer surface.

12. The oral appliance of claim 1, wherein said at least one node disposed on said lower body base outer surface consists of a node occurring on one of a left posterior portion of said lower body base outer surface or a right posterior portion of said lower body base outer surface.

13. The oral appliance of claim 1, wherein said at least one node disposed on said lower body base outer surface consists of a pair of nodes, one occurring on a left posterior portion of said lower body base outer surface and one occurring on a right posterior portion of said lower body base outer surface.

14. The oral appliance of claim 1, wherein said at least one node disposed on said lower body base outer surface consists of a plurality of nodes one of said plurality of nodes disposed on said left posterior portion of said lower body base outer surface and one of said plurality of nodes occurring on a right posterior portion of said lower body base outer surface and one of said plurality of nodes occurring on an anterior medial portion of said lower body base outer surface.

* * * * *